(12) United States Patent
Yasue et al.

(10) Patent No.: US 8,830,114 B2
(45) Date of Patent: Sep. 9, 2014

(54) MOBILE OBJECT DETECTING APPARATUS

(75) Inventors: Tomoyoshi Yasue, Toyota (JP); Tomoyoshi Kushida, Nisshin (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 291 days.

(21) Appl. No.: 13/510,638

(22) PCT Filed: Sep. 30, 2010

(86) PCT No.: PCT/JP2010/067090
§ 371 (c)(1),
(2), (4) Date: May 18, 2012

(87) PCT Pub. No.: WO2012/042636
PCT Pub. Date: Apr. 5, 2012

(65) Prior Publication Data
US 2012/0235850 A1    Sep. 20, 2012

(51) Int. Cl.
*G01S 13/04* (2006.01)
*G01S 13/56* (2006.01)
*G01S 13/87* (2006.01)
*G01S 13/536* (2006.01)
*G01S 13/00* (2006.01)
*G08B 13/16* (2006.01)

(52) U.S. Cl.
CPC ............... *G01S 13/56* (2013.01); *G01S 13/87* (2013.01); *G08B 13/1627* (2013.01); *G01S 13/04* (2013.01)
USPC .............. 342/28; 342/27; 342/59; 342/175; 342/188; 342/195; 340/500; 340/540; 340/541; 340/552; 340/553; 340/554

(58) Field of Classification Search
USPC ............. 342/21, 22, 27, 28, 59, 175, 188, 342/192–197, 70–72, 450, 451, 463–465; 340/500, 540, 541, 552–557; 367/87, 367/93, 94, 117
See application file for complete search history.

(56) References Cited

U.S. PATENT DOCUMENTS 2,038,878 A * 4/1936 Strutt ........................... 340/553
2,177,061 A * 10/1939 Gerhard ........................ 342/28
(Continued)

FOREIGN PATENT DOCUMENTS

JP  54-162497   12/1979
JP  58-66074    4/1983
(Continued)

OTHER PUBLICATIONS

International Search Report in International Application No. PCT/JP2010/067090; Mailing Date: Oct. 26, 2010.

*Primary Examiner* — Bernarr Gregory
(74) *Attorney, Agent, or Firm* — Finnegan, Henderson, Farabow, Garrett & Dunner, LLP

(57) ABSTRACT

A mobile object detecting apparatus includes first radiation detecting means; and second radiation detecting means for radiating an electromagnetic wave having the same frequency as the electromagnetic wave radiated by the first radiation detecting means such that the radiated electromagnetic wave passes near a point in the first radiation detecting means from which the electromagnetic wave is radiated, and detecting a standing wave which is generated due to reflection of the radiated electromagnetic wave at an object; wherein a distance, over which the electromagnetic wave radiated by the first radiation detecting means travels until it reaches near the first radiation detecting means, corresponds to a distance of an integral multiple of a wave length of a half cycle of the electromagnetic waves radiated by the radiation detecting means plus a wave length of a predetermined period which is smaller than the half cycle.

12 Claims, 17 Drawing Sheets

(56) References Cited

U.S. PATENT DOCUMENTS

| | | | | |
|---|---|---|---|---|
| 2,197,028 A * | 4/1940 | Wolff | | 342/27 |
| 2,203,807 A * | 6/1940 | Wolff | | 340/552 |
| 2,247,246 A * | 6/1941 | Lindsay et al. | | 340/553 |
| 2,649,538 A * | 8/1953 | Marlowe et al. | | 340/552 |
| 2,656,527 A * | 10/1953 | Tillman | | 342/27 |
| 2,660,718 A * | 11/1953 | Summerhayes, Jr. et al. | | 340/552 |
| 3,562,749 A * | 2/1971 | Tsukushi et al. | | 340/552 |
| 3,733,602 A * | 5/1973 | Cuckler et al. | | 342/27 |
| 3,805,061 A * | 4/1974 | De Missimy et al. | | 340/552 |
| 3,877,002 A * | 4/1975 | Cheal et al. | | 340/552 |
| 4,191,953 A * | 3/1980 | Woode | | 340/552 |
| 4,207,560 A * | 6/1980 | Poirier | | 340/552 |
| 4,553,135 A * | 11/1985 | Grynberg et al. | | 340/552 |
| 4,580,249 A * | 4/1986 | Magee et al. | | 340/553 |
| 4,661,936 A * | 4/1987 | Magee et al. | | 340/553 |
| 4,760,381 A * | 7/1988 | Haag | | 340/556 |
| 5,160,915 A * | 11/1992 | Kiss | | 340/552 |
| 5,268,698 A * | 12/1993 | Smith et al. | | 342/450 |
| 5,376,922 A * | 12/1994 | Kiss | | 340/552 |
| 6,127,926 A * | 10/2000 | Dando | | 340/541 |
| 6,208,248 B1 * | 3/2001 | Ross | | 340/552 |
| 6,307,475 B1 * | 10/2001 | Kelley | | 340/554 |
| 6,466,157 B1 * | 10/2002 | Bjornholt et al. | | 342/28 |
| 6,885,300 B1 * | 4/2005 | Johnston et al. | | 340/541 |
| 7,804,441 B1 * | 9/2010 | DeChiaro, Jr. | | 342/22 |
| 7,928,900 B2 * | 4/2011 | Fuller et al. | | 342/175 |
| 8,138,918 B2 * | 3/2012 | Habib et al. | | 340/552 |

FOREIGN PATENT DOCUMENTS

| | | |
|---|---|---|
| JP | 10-239426 | 9/1998 |
| JP | 2002-267744 | 9/2002 |
| JP | 2002-277558 | 9/2002 |
| JP | 2002-357656 | 12/2002 |
| JP | 2007-170990 | 7/2007 |
| JP | 2009-213881 | 9/2009 |

* cited by examiner

MOBILE OBJECT DETECTING APPARATUS

CROSS-REFERENCE TO RELATED APPLICATIONS

This application is a national phase application of International Application No. PCT/JP2010/067090, filed Sep. 30, 2010, the contents of which are incorporated herein by reference.

TECHNICAL FIELD

The present invention is related to a mobile object detecting apparatus which radiates electromagnetic waves to an object to be measured and detects a movement of an object or the presence or absence of a mobile object. In particular, the present invention is related to a mobile object detecting apparatus which detects a movement of an object or the presence or absence of a mobile object using a standing wave generated between the mobile object detecting apparatus and the object.

BACKGROUND ART

Known types of radar apparatus include a pulse radar type and a FM-CW type. The pulse radar type transmits a pulse-like electromagnetic wave to an object to be measured and measures a time until the electromagnetic wave returns after having been reflected by the object to be measured, thereby calculating a distance to the object to be measured.

The FM-CW type generates a beat signal by mixing transmission signals and reception signals whose frequency increase gradually, determines frequencies (i.e., beat frequencies) on a section basis wherein the sections include increasing sections where the frequencies of the transmission signals increase and decreasing sections where the frequencies of the transmission signals decrease, and measures a distance or a relative velocity with respect to the object to be measured based on the beat frequencies in the increasing sections and the beat frequencies in the decreasing sections.

Further, a mobile object detecting apparatus is known which detects a movement of an object or the presence or absence of a mobile object (merely referred to as "the movement of an object" hereinafter) using a standing wave (stationary wave). The standing wave is generated when different electromagnetic waves (traveling waves), which have the same frequency and different traveling directions, overlap one another. The mobile object detecting apparatus, which utilizes the standing wave, generates the standing wave by overlaying the electromagnetic wave radiated by an antenna on the electromagnetic wave returning after having been reflected by the object. The mobile object detecting apparatus detects the movement of the object by utilizing the fact that amplitude of the standing wave varies with the movement of the object (with the variation in distance between the mobile object detecting apparatus and the object).

The mobile object detecting apparatus, which utilizes the standing wave to detect the movement of the object, can detect the movement of the object in a short distance with high precision in comparison with the pulse radar type and the FM-CW type. Thus, it is suitably used in intrusion sensors for determining whether there is an intruder in a cabin of an automobile or a home, sensors for detecting actions of a driver of an automobile, sensors for detecting a heart beat, breathing, a body movement, etc., of a human, etc. It is noted that in such a mobile object detecting apparatus, it is also possible to measure the distance to the object by analyzing variations in amplitude when the frequency of the electromagnetic wave is varied.

FIG. 1 is a diagram for illustrating a situation in which an antenna of the mobile object detecting apparatus radiates a transmission wave and the reflected wave returns to the antenna after having been reflected by the object. In FIG. 1, AT indicates the antenna, OB indicates the object, α indicates the transmission wave, and β indicates the reflected wave.

The standing wave is formed of a combination of the transmission wave α and the reflected wave β. In the following, the standing wave is indicated by γ. Further, it is assumed here that there is no attenuation of the reflected wave β. The amplitude of the standing wave γ becomes 0 when the distance between the antenna AT and the object OB is N×λ/4, where N is a positive integer and even number. FIG. 2 is a diagram for illustrating a situation in which the amplitude of the standing wave γ becomes 0. The amplitude of the standing wave γ becomes its maximum when the distance between the antenna AT and the object OB is M×λ/4, where M is a positive integer and odd number. FIG. 3 is a diagram for illustrating a situation in which the amplitude of the standing wave γ becomes its maximum.

In this way, the standing wave generated between the object and the antenna by radiating the electromagnetic wave from the antenna varies periodically with the distance between the antenna and the object. Thus, by monitoring the variation in the amplitude, it is possible to detect the movement of the object.

JP 2002-357656 A discloses a measurement apparatus which measures a distance to an object to be measured by detecting the standing wave. According to the apparatus, detection means are provided closer to the object to be measured than transmission means for transmitting the electromagnetic wave. The distance to the object to be measured is measured based on a detection signal function formed from a frequency of the electromagnetic wave emitted by the transmission means and the amplitude of the standing wave detected by the detection means.

JP 2007-170990 A discloses an apparatus directed to precisely detect a small movement of the object although it does not use the standing wave. According to the apparatus, the frequency of the transmission signal and the reception signal are converted to a lower frequency using a local signal with a predetermined frequency and a movement status of the subject to be detected is determined based on a difference in a phase between the transmission signal and the reception signal.

However, according to the apparatus which utilizes the standing wave to detect the movement of the object, there may be cases where the movement of the object cannot be detected precisely if the object is located near antinodes or nodes in which the variation in the amplitude of the standing wave with respect to the variation in the distance to the object becomes smaller. The antinodes of the standing wave are points in which the amplitude is maximum and the nodes of the standing wave are points in which the amplitude is minimum. In other words, sensitivity of the apparatus becomes lower if the distance between the apparatus and the object has a predetermined relationship.

FIG. 4 is a diagram for explaining the variation in the amplitude of the standing wave with respect to the same displacement. In FIG. 4, a lateral axis indicates the distance with respect to the antenna. As illustrated in FIG. 4, if the object is located at a point X1 corresponding to the node of the standing wave, or if object is located at a point X3 corresponding to the antinode of the standing wave, the amplitude variation with respect to the replacement of the object (i.e., the variation in the distance to the antenna) becomes minimum. Thus, detection sensitivity for the movement of the object located at the point X1 or X3 becomes low. On the other hand, if the object is located at a point X2 corresponding to a midpoint between the node and the antinode of the standing wave, the amplitude variation with respect to the replacement of the object becomes maximum. Thus, detection sensitivity for the movement of the object located at the point X2 becomes high. It is noted that in FIG. 4, N0, N1, N2 are positive even integers and M1, M2 are positive odd integers.

In this way, according to the apparatus which utilizes the standing wave to detect the movement of the object, high sensitivity regions and low sensitivity regions appear alternately at a λ/8 interval as a distance from the apparatus. λ is a wavelength of the transmission wave, as described above. In particular, if the size of the object located in the low sensitivity region is small, an influence of the low sensitivity becomes larger and thus there is a probability that the movement of the object is not detected.

FIG. 5 is a diagram for illustrating a distribution of the high sensitivity regions and the low sensitivity regions generated in the mobile object detecting apparatus utilizing the standing wave, and the object which meets a specific requirement when it becomes difficult to be detected. As illustrated in FIG. 5, and as described with reference to FIG. 4, the high sensitivity regions and the low sensitivity regions of the mobile object detecting apparatus appear alternately and concentrically centered at the antenna AT. A separation between a center portion H of the high sensitivity regions and center portions L1, L2 (L1 corresponds to the node of the standing wave, and L2 corresponds to the antinode of the standing wave) of the low sensitivity regions is λ/8.

Since the size of the object OB1 in FIG. 5 is sufficiently large, the object OB1 has a portion located in the high sensitivity region. Consequently, the displacement of the object OB1 is detected with high sensitivity by the mobile object detecting apparatus, and thus likelihood that the movement of the object OB1 is not detected becomes low.

On the other hand, the object OB2 in the FIG. 5 has a smaller size, and is located as a whole in the low sensitivity region. In this case, if the displacement of the object OB2 is smaller than λ/8, the displacement of the object OB2 becomes difficult to be detected by the mobile object detecting apparatus, and thus likelihood that the movement of the object OB2 is not detected becomes high.

With respect to such a problem, in JP 2007-170990 A, the following is described. [According to a near-sinusoidal standing wave, the amplitude variation of the standing wave near the amplitude maximum point is small, and thus detection of the maximum amplitude of the standing wave may involve an error. This detection error of the maximum amplitude directly leads to the detection error of a minute movement amount. Thus, in prior art, there is a problem that the accuracy of the detection of the minute movement amount becomes lower because of the detection error of the maximum amplitude of the standing wave.].

In order to solve the problem, it can be contemplated that a relationship between the distance from the apparatus to the object and the wave length of the standing wave is modified by tuning the frequency (wave length) or a position of the antenna. However, tuning of the frequency or the antenna position requires professional technique and thus cannot be performed easily by end users. Further, if the position of the object is not known in advance, it is not possible to use this technique.

SUMMARY OF INVENTION

The present invention is made in consideration of the matters as described above, and it is an object of the present invention to provide a mobile object detecting apparatus which can prevent the reduced accuracy of detection without requiring tuning of the frequency or the antenna position.

In order to solve the aforementioned problems, according to a first embodiment of the present invention, a mobile object detecting apparatus includes:

first radiation detecting means for radiating an electromagnetic wave and detecting a standing wave which is generated due to reflection of the radiated electromagnetic wave at an object; and second radiation detecting means for radiating an electromagnetic wave having the same frequency as the electromagnetic wave radiated by the first radiation detecting means such that the radiated electromagnetic wave passes near a point in the first radiation detecting means from which the electromagnetic wave is radiated, and detecting a standing wave which is generated due to reflection of the radiated electromagnetic wave at an object;

wherein the mobile object detecting apparatus is configured to detect a movement of an object or the presence or absence of a mobile object based on the standing wave detected by the first radiation detecting means and/or the standing wave detected by the second radiation detecting means, and a distance, over which the electromagnetic wave radiated by the first radiation detecting means travels until it reaches near the point in the first radiation detecting means from which the electromagnetic wave is radiated, corresponds to a distance of an integral multiple of a wave length of a half cycle of the electromagnetic waves radiated by the first and second radiation detecting means plus a wave length of a predetermined period which is smaller than the half cycle.

According to the first aspect of the present invention, the first radiation detecting means and the second radiation detecting means complement each other with respect to the low sensitivity regions. Therefore, it is possible to prevent the reduced accuracy of detection without requiring the tuning of the frequency or the antenna position.

In the first aspect, preferably, the wave length of a predetermined period corresponds to a wave length of a one-eighth cycle of the electromagnetic waves radiated by the first and second radiation detecting means.

With this arrangement, since the low sensitivity regions of the first radiation detecting means exactly overlap with the high sensitivity regions of the second radiation detecting means, it is possible to more advantageously prevent the reduced accuracy of the detection.

Further, in the first aspect, preferably, the electromagnetic waves radiated by the first and second radiation detecting means have perpendicular planes of polarization.

With this arrangement, the first and second radiation detecting means can detect only the corresponding standing waves which the first and second radiation detecting means generates for itself.

Further, in the first aspect, preferably, the second radiation detecting means radiates the electromagnetic wave in a direction opposite to a direction in which the first radiation detecting means radiates the electromagnetic wave, and reflects the radiated electromagnetic wave at a reflective member with an elliptical cross section to be directed to the point in the first radiation detecting means from which the electromagnetic wave is radiated, and the elliptical shape of the reflective member has two focal points at points in the first and second radiation detecting means from which the electromagnetic waves are radiated.

With this arrangement, the electromagnetic wave radiated by the second radiation detecting means is directed to the point in the first radiation detecting means from which the electromagnetic wave is radiated. The directed electromagnetic wave spreads and travels to the detection area of the mobile object detecting apparatus as if it were radiated by the first radiation detecting means after it passes near the point in the first radiation detecting means from which the electromagnetic wave is radiated. Thus, if the directivity of the first and second radiation detecting means are made substantially the same, the detection area of the first radiation detecting means can correspond to the detection area of the second radiation detecting means.

Further, in the first aspect, preferably, the second radiation detecting means is located behind the first radiation detecting means when viewed in a direction of radiation of the electromagnetic wave of the first radiation detecting means, and radiates the electromagnetic wave in substantially the same direction as the first radiation detecting means via a dielectric lens for refracting the electromagnetic wave, the dielectric lens being disposed between the second radiation detecting means and the first radiation detecting means.

According to a second aspect of the present invention, mobile object detecting apparatus includes:

first radiation detecting means for radiating an electromagnetic wave and detecting a standing wave which is generated due to reflection of the radiated electromagnetic wave at an object;

plural second radiation detecting means for radiating electromagnetic waves having the same frequency as the electromagnetic wave radiated by the first radiation detecting means such that the radiated electromagnetic waves pass near the first radiation means, and detecting standing waves which are generated due to reflection of the radiated electromagnetic waves at an object, the second radiation detecting means being located behind the first radiation detecting means when viewed in a direction of radiation of the electromagnetic wave of the first radiation detecting means;

wherein the mobile object detecting apparatus is configured to detect a movement of an object or the presence or absence of a mobile object based on the standing wave detected by the first radiation detecting means and/or the standing wave detected by the second radiation detecting means, and distances, over which the electromagnetic waves radiated by the first radiation detecting means travel until they reach near the first radiation detecting means, correspond to a distance of an integral multiple of a wave length of a half cycle of the electromagnetic waves radiated by the first and second radiation detecting means plus a wave length of a predetermined period which is smaller than the half cycle.

According to the second aspect of the present invention, the first radiation detecting means and the second radiation detecting means complement each other with respect to the low sensitivity regions. Therefore, it is possible to prevent the reduced accuracy of detection without requiring tuning of the frequency or the antenna position.

In the second aspect, preferably, the electromagnetic waves radiated by the first and second radiation detecting means have planes of polarization which differ by a predetermined angle.

With this arrangement, the first and second radiation detecting means can easily detect the corresponding standing waves which the first and second radiation detecting means generates for itself.

According to the present invention, a mobile object detecting apparatus can be provided which can prevent the reduced accuracy of the detection without requiring the tuning of the frequency or the antenna position.

Figure 1:
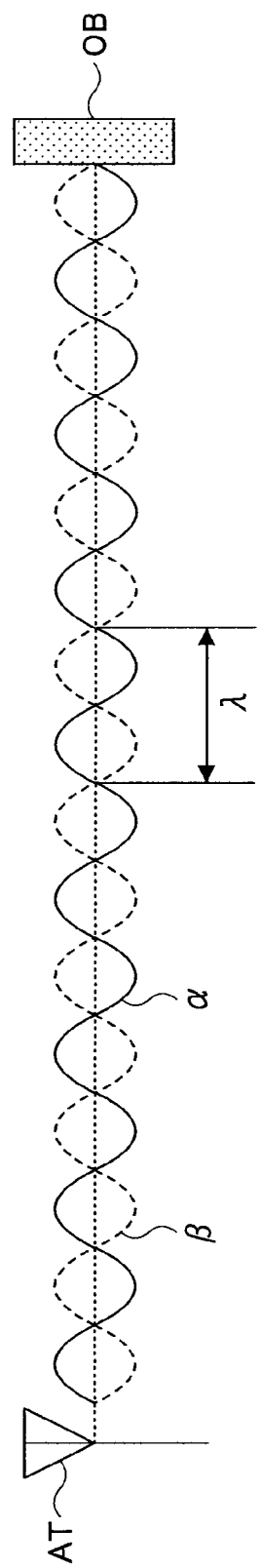
FIG. 1 is a diagram for illustrating a situation in which an antenna of a mobile object detecting apparatus radiates a transmission wave and the reflected wave returns to the antenna after having been reflected by the object.
Figure 2:
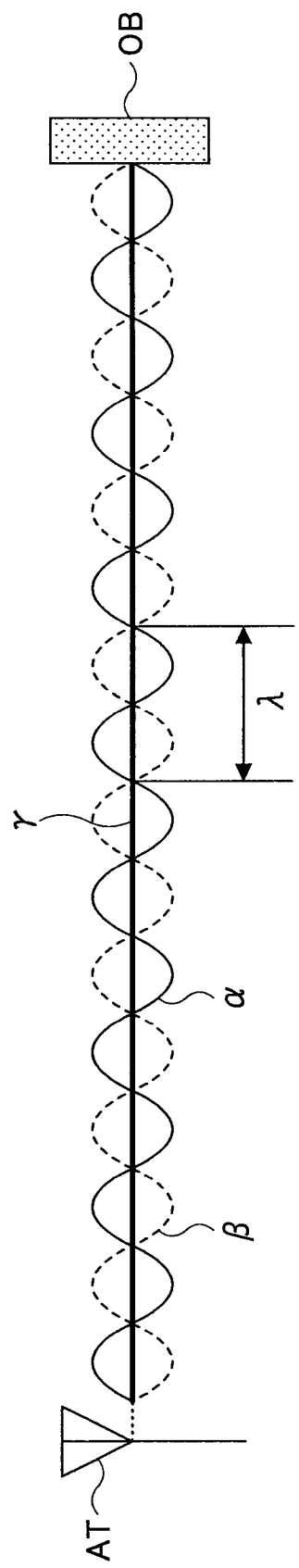
FIG. 2 is a diagram for illustrating a situation in which amplitude of a standing wave becomes 0.
Figure 3:
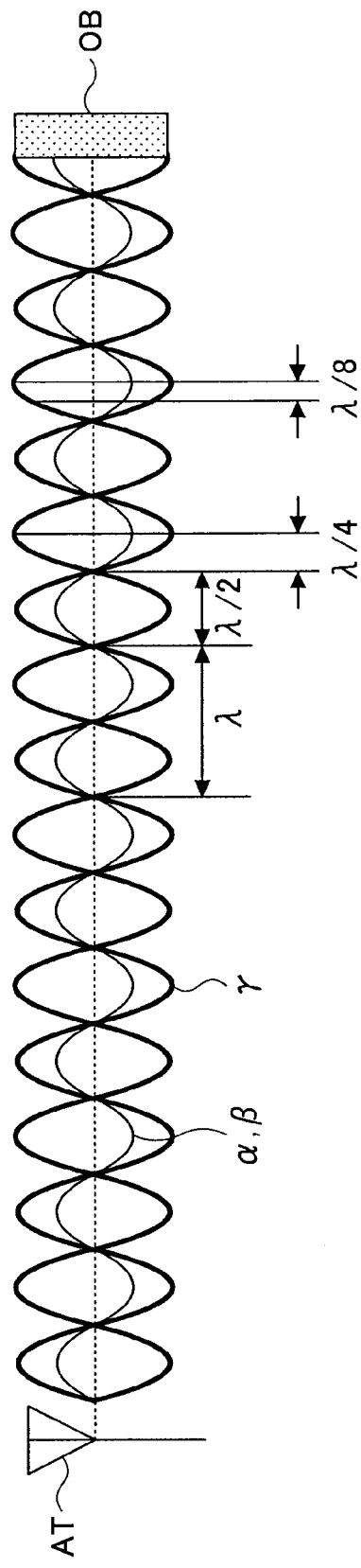
FIG. 3 is a diagram for illustrating a situation in which amplitude of a standing wave becomes maximum.
Figure 4:
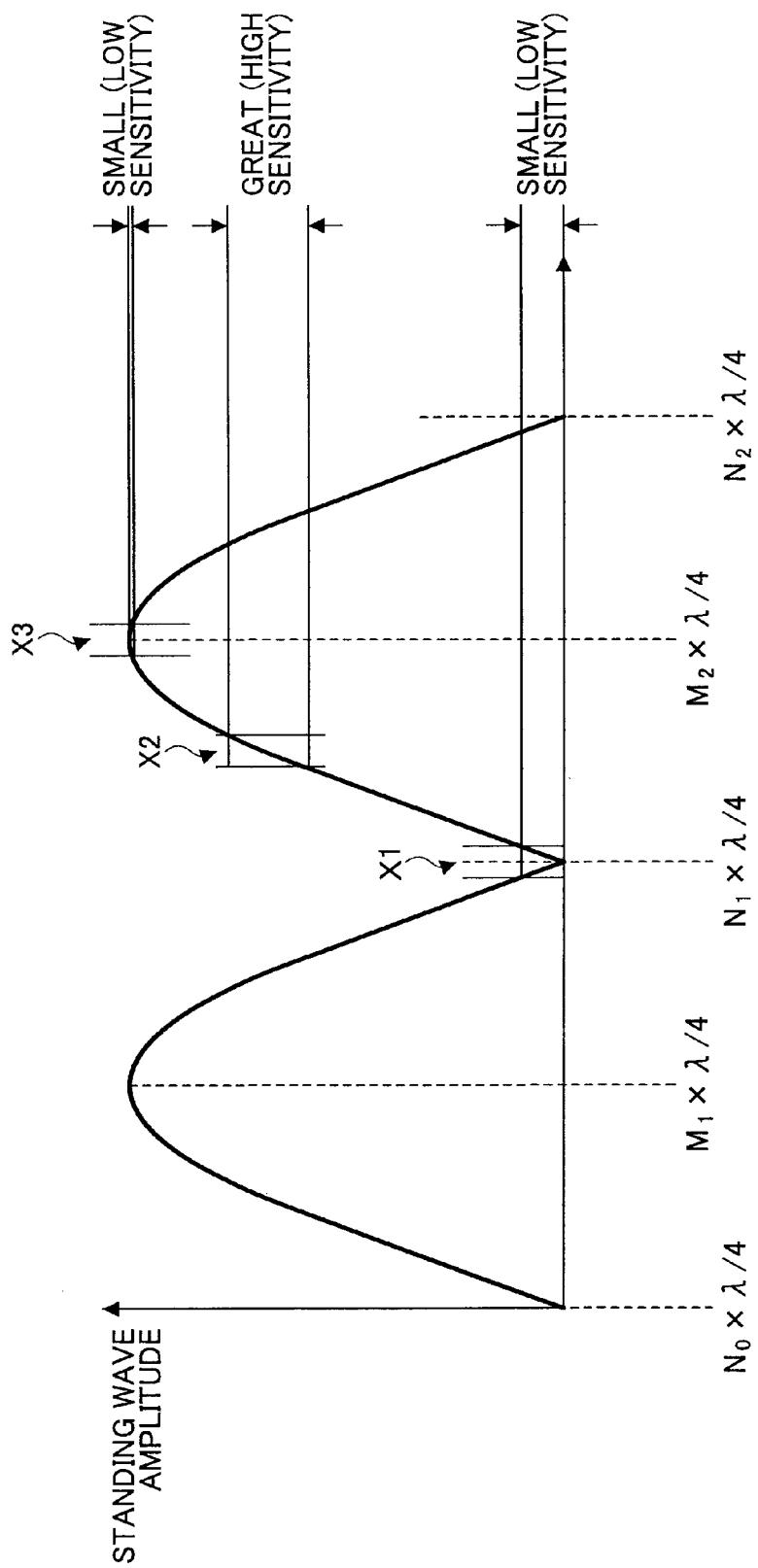
FIG. 4 is a diagram for explaining the variation in the amplitude of the standing wave with respect to the same displacement.
Figure 5:
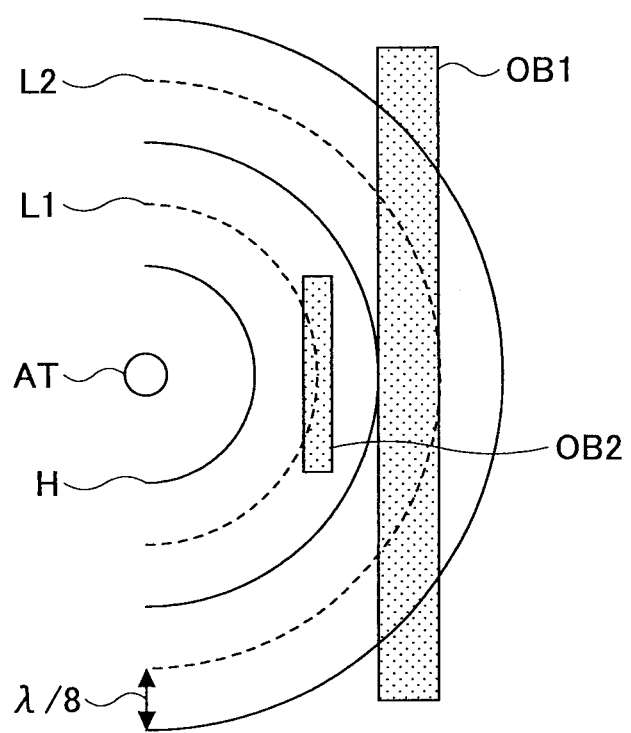
FIG. 5 is a diagram for illustrating a distribution of high sensitivity regions and low sensitivity regions generated in the mobile object detecting apparatus utilizing the standing wave, and the object which meets a specific requirement when it becomes difficult to be detected.

EXPLANATION FOR REFERENCE NUMBERS 1,2 mobile object detecting apparatus
10 first transmission/reception antenna
10a, 10b first transmission/reception antennas
20 second transmission/reception antenna
20a, 20b, 20c second transmission/reception antennas
25a, 25b, 25c third transmission/reception antennas
30 reflective member
35 dielectric lens
40 oscillator apparatus
50 standing wave strength detection apparatus
AT antenna
OB object
VB oscillator apparatus
DT standing wave strength detection apparatus
IM detection resolution increasing apparatus
α transmission wave
β reflected wave
γ standing wave

BEST MODE FOR CARRYING OUT THE INVENTION

In the following, a mode for carrying out the present invention will be described by referring to embodiments with reference to the accompanying drawings.

Embodiment

First Embodiment

Figure 6:
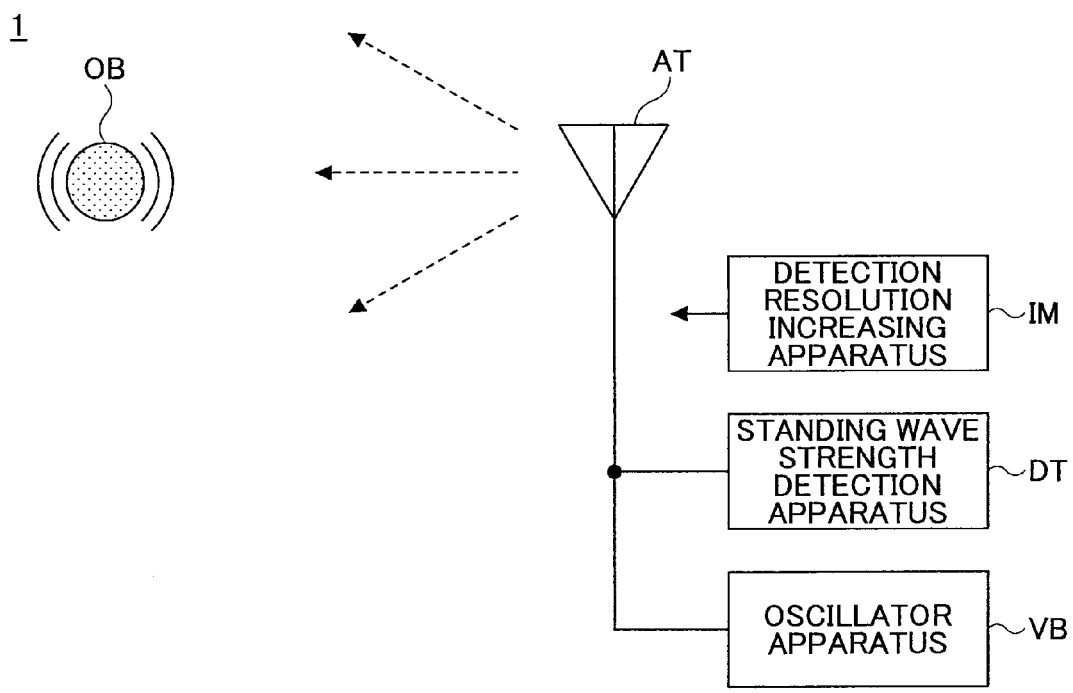
FIG. 6 is a conceptual diagram of a mobile object detecting apparatus according to the present invention.

In the following, a mobile object detecting apparatus 1 according to a first embodiment of the present invention will be described with reference to the accompanying drawings. FIG. 6 is a conceptual diagram of a mobile object detecting apparatus according to the present invention. As illustrated in FIG. 6, the mobile object detecting apparatus according to the present invention enables detecting the movement of the mobile object OB (or its existence) which displaces by a minute displacement smaller than or equal to a wavelength of the radiated electromagnetic wave. The mobile object detecting apparatus includes a transmission/reception antenna AT, an oscillator apparatus VB, a standing wave strength detection apparatus DT, and a detection resolution increasing apparatus IM.

Figure 7:
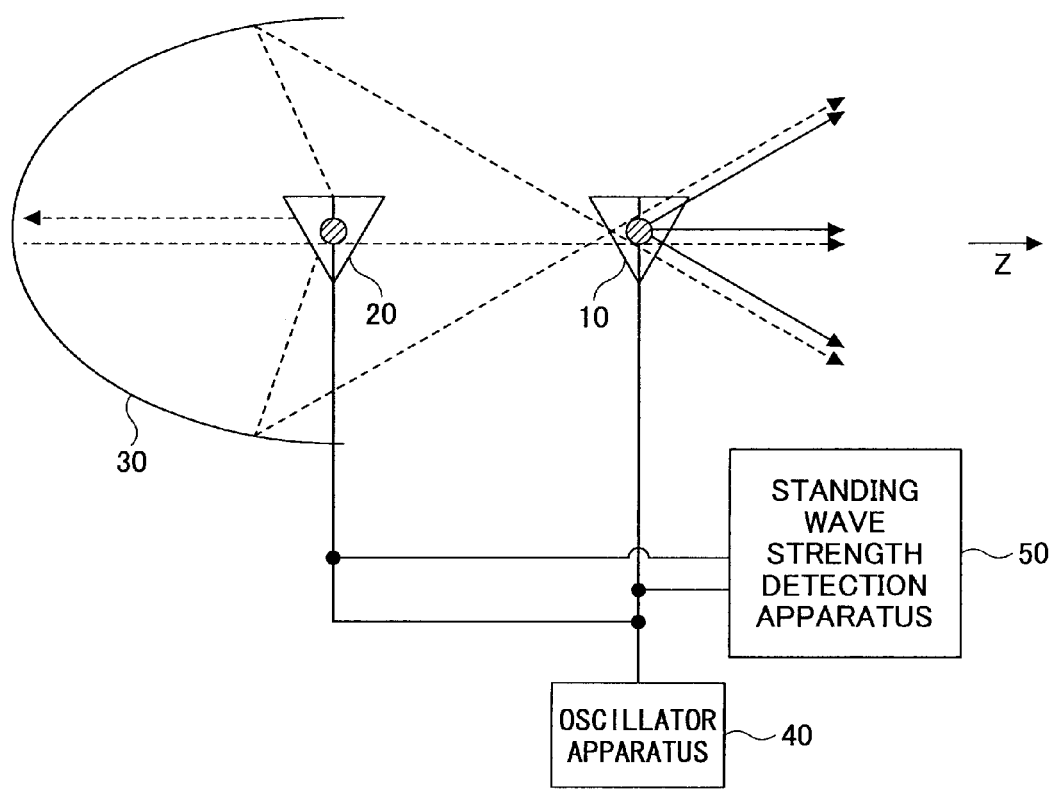
FIG. 7 is a diagram for illustrating a configuration example of a mobile object detecting apparatus 1 according to a first embodiment.

In the following, it is described in detail. FIG. 7 is a diagram for illustrating a configuration example of a mobile object detecting apparatus 1 according to a first embodiment. The mobile object detecting apparatus 1 includes, as main components, a first transmission/reception antenna 10, a second transmission/reception antenna 20, a reflective member 30, an oscillator apparatus 40 and standing wave strength detection apparatus 50. The second transmission/reception antenna 20 and the reflective member 30 correspond to the detection resolution increasing apparatus IM illustrated in FIG. 6.

The first and second transmission/reception antennas 10 and 20 are of a transmission-reception integral-type with a certain directivity. The first and second transmission/reception antennas 10 and 20 radiate electromagnetic waves according to voltages supplied from the oscillator apparatus 40. The first and second transmission/reception antennas 10 and 20 have a construction multilayered successively by a mirostrip line, a ground member having a slit formed therein and a patch antenna, for example. The first and second transmission/reception antennas 10 and 20 may be arranged in arrays to increase their directivity.

The first transmission/reception antenna 10 radiates a microwave toward a central direction (a Z direction in FIG. 7) of a detection area of the mobile object detecting apparatus 1. Further, at the transmission/reception antenna 10 an antenna voltage according to the amplitude of the standing wave is generated. The standing wave is generated when the radiated microwave is reflected by the object. The antenna voltage is input to the standing wave strength detection apparatus 50 in which it is used to detect the movement of the object.

On the other hand, the second transmission/reception antenna 20 radiates a microwave, which has the same frequency as the microwave radiated by the first transmission/reception antenna 10, toward an opposite side with respect to the central direction (the Z direction in FIG. 7) of the detection area of the mobile object detecting apparatus 1. The microwave radiated by the second transmission/reception antenna 20 is reflected by the reflective member 30. The reflective member 30 is a concave-shaped member made of a metal, etc., which reflects microwaves. The reflective member 30 is has a dome-like shape which is formed by a trajectory when a part of an ellipse whose focal points are located at the first transmission/reception antenna 10 and the second transmission/reception antenna 20 is rotated around a line connecting the first transmission/reception antenna 10 and the second transmission/reception antenna 20, for example. In other words, a cross section of the reflective member 30 includes an elliptical shape whose two focal points are located at the first transmission/reception antenna 10 and the second transmission/reception antenna 20. Hatched circles in FIG. 7 indicate the focal points of such an ellipse.

It is noted that the shape of the reflective member 30 is not limited to this. The reflective member 30 may have a polyhedron shape, etc., whose cross section is similar to an ellipse.

Because of the relationship between the ellipse and the focal points, the microwave radiated by the second transmission/reception antenna 20 is directed to a point near the first transmission/reception antenna 10. The directed microwave spreads and travels to the detection area of the mobile object detecting apparatus 1 as if it were radiated by the first transmission/reception antenna after it passes near the first transmission/reception antenna 10. Thus, if the directivity of the first and second transmission/reception antenna 10 and 20 are made substantially the same, the detection area of the first transmission/reception antenna 10 can correspond to the detection area of the second transmission/reception antenna 20.

When the microwave radiated by the second transmission/reception antenna 20 is reflected by the object, the standing wave is generated between the second transmission/reception antenna 20 and the object via the reflective member 30. At the transmission/reception antenna 20 an antenna voltage according to the amplitude of the standing wave is generated. The antenna voltage is input to the standing wave strength detection apparatus 50 in which it is used to detect the movement of the object.

The microwave radiated by the first transmission/reception antenna 10 has a plane of polarization perpendicular to a plane of polarization of the microwave radiated by the second transmission/reception antenna 20. With this arrangement, each of the first transmission/reception antenna 10 and the second transmission/reception antenna 20 can detect as an antenna voltage only the corresponding standing waves which each antenna generates for itself.

Further, positional relationship between the first transmission/reception antenna 10, the second transmission/reception antenna 20 and the reflective member 30 is set such that a distance over which the microwave radiated by the second transmission/reception antenna 20 travels until it reaches the point near the first transmission/reception antenna 10 becomes ($K \times \lambda/2 + \lambda/8$), where K is a positive integer and $\lambda$ is a frequency of the microwaves radiated by the first transmission/reception antenna 10 and the second transmission/reception antenna 20.

With this arrangement, the first transmission/reception antenna 10 and the second transmission/reception antenna 20 complement each other with respect to the low sensitivity regions, and thus can prevent the reduction of the detection accuracy of the mobile object detecting apparatus 1.

Figure 8:
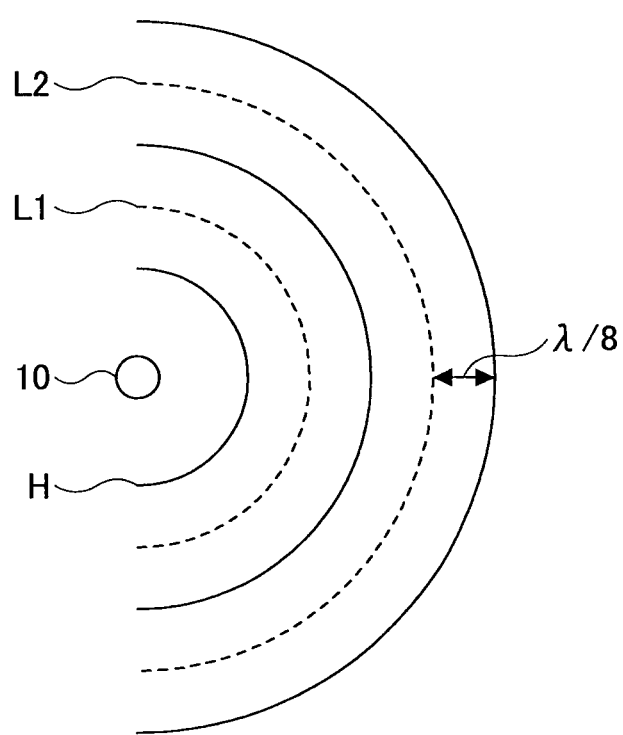
FIG. 8 is a diagram for illustrating a distribution of high sensitivity regions and low sensitivity regions centered at a first transmission/reception antenna 10 when a standing wave is generated by the first transmission/reception antenna 10.

FIG. 8 is a diagram for illustrating a distribution of high sensitivity regions and low sensitivity regions centered at a first transmission/reception antenna 10 when the standing wave is generated by the first transmission/reception antenna 10. As illustrated in FIG. 8, the high sensitivity regions and the low sensitivity regions with respect to the standing wave generated by the first transmission/reception antenna 10 alternately appear in a concentric manner centered at the first transmission/reception antenna 10, and separation between center portions H of the high sensitivity regions and center portions L1, L2 of the low sensitivity regions is $\lambda/8$.

Figure 9:
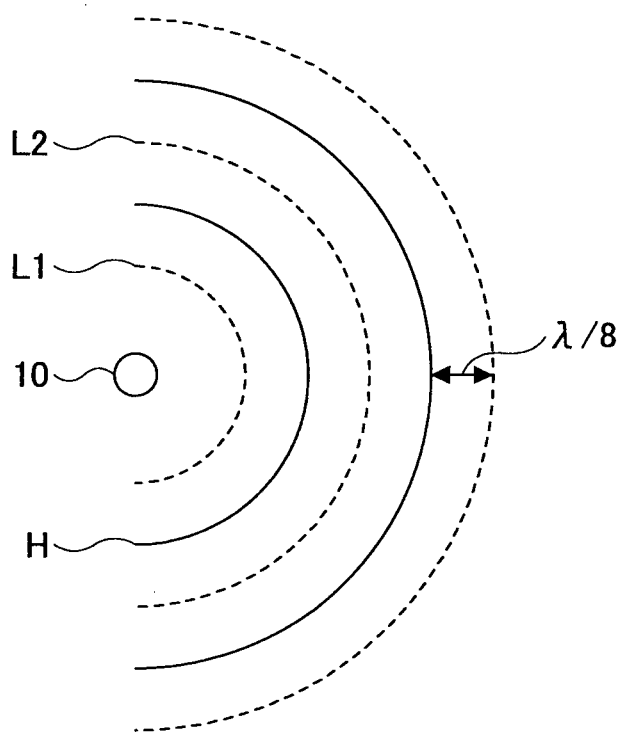
FIG. 9 is a diagram for illustrating a distribution of high sensitivity regions and low sensitivity regions centered at a first transmission/reception antenna 10 when a standing wave is generated by a second transmission/reception antenna 20.

FIG. 9 is a diagram for illustrating a distribution of high sensitivity regions and low sensitivity regions centered at the first transmission/reception antenna 10 when a standing wave is generated by a second transmission/reception antenna 20. The high sensitivity regions and the low sensitivity regions with respect to the standing wave generated by the second transmission/reception antenna 20 alternately appear in a concentric manner centered at the first transmission/reception antenna 10, and separation between center portions H of the high sensitivity regions and center portions L1, L2 of the low sensitivity regions is $\lambda/8$. These are as in the case of the standing wave generated by the first transmission/reception antenna 10. However, as described above, a distance over which the microwave radiated by the second transmission/reception antenna 20 travels until it reaches the point near the first transmission/reception antenna 10 is configured to be ($K \times \lambda/2 + \lambda/8$), where K is a positive integer. Thus, the standing wave generated by the second transmission/reception antenna 20 has a phase difference corresponding to the wavelength $\lambda/8$ with respect to the standing wave generated by the first transmission/reception antenna 10. It is noted that the wavelength between the nodes or the wavelength between the antinodes is $\lambda/2$.

Figure 10:
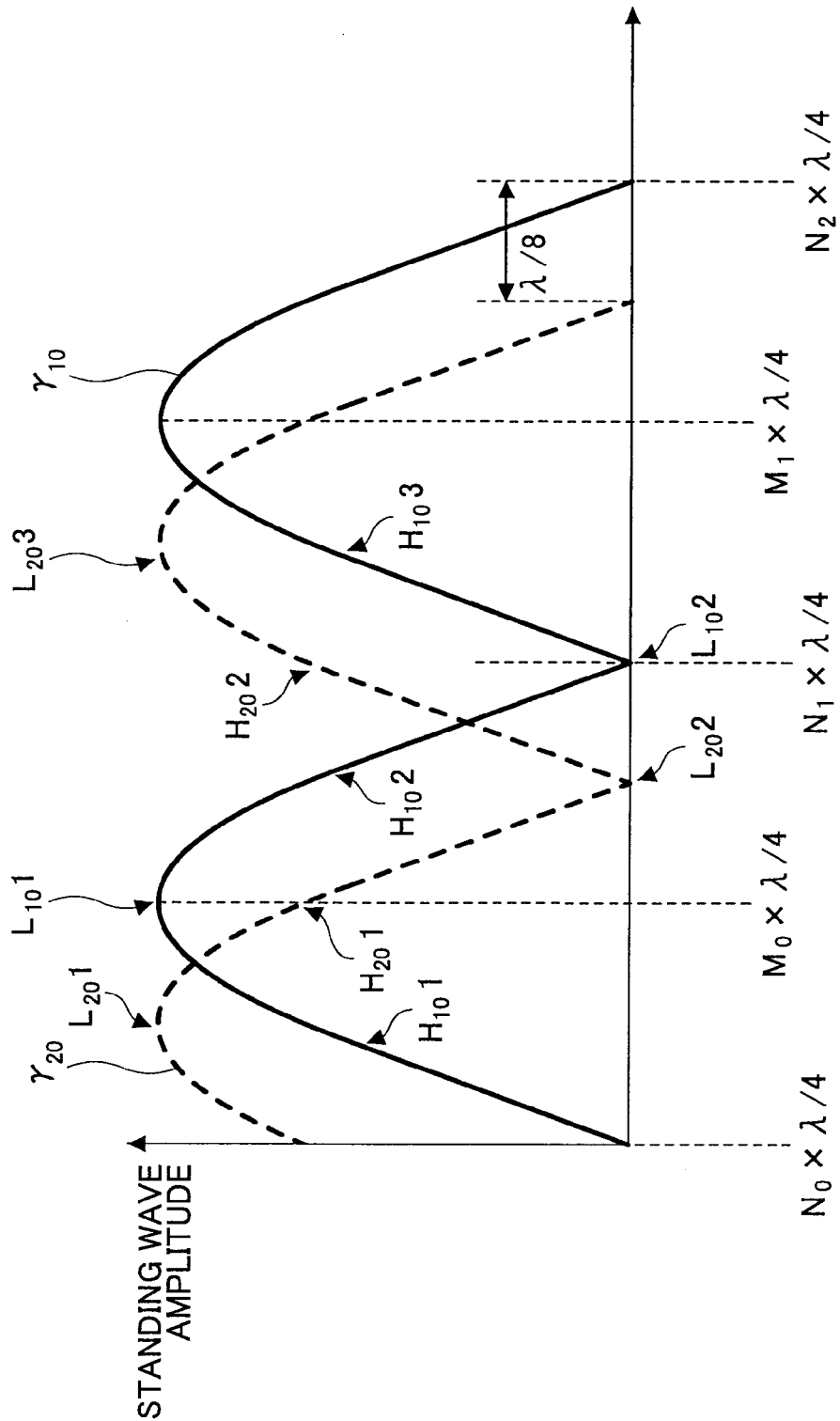
FIG. 10 is a diagram for illustrating a situation in which the high sensitivity regions and the low sensitivity regions of the standing waves generated by the first transmission/reception antenna and the second transmission/reception antenna 20 overlap one another.

Consequently, the low sensitivity regions of the standing wave generated by the first transmission/reception antenna 10 and the high sensitivity regions of the standing wave generated by the second transmission/reception antenna 20 overlap one another, and the high sensitivity regions of the standing wave generated by the first transmission/reception antenna 10 and the low sensitivity regions of the standing wave generated by the second transmission/reception antenna 20 overlap one another. FIG. 10 is a diagram for illustrating a situation in which the high sensitivity regions and the low sensitivity regions of the standing waves generated by the first transmission/reception antenna and the second transmission/reception antenna 20 overlap one another. In FIG. 10, the lateral axis indicates the distance from the first transmission/reception antenna 10. As illustrated in FIG. 10, the center portions $L_{10}$2 of the low sensitivity regions of the standing wave $\gamma_{10}$ generated by the first transmission/reception antenna 10 overlap with the center portions $H_{20}$2 of the high sensitivity regions of the standing wave $\gamma_{20}$ generated by the second transmission/reception antenna 20, and the center portions $L_{20}$3 of the low sensitivity regions of the standing wave $\gamma_{20}$ generated by the second transmission/reception antenna 20 overlap with the center portions $H_{10}$3 of the high sensitivity regions of the standing wave $\gamma_{10}$ generated by the first transmission/reception antenna 10.

Figure 11:
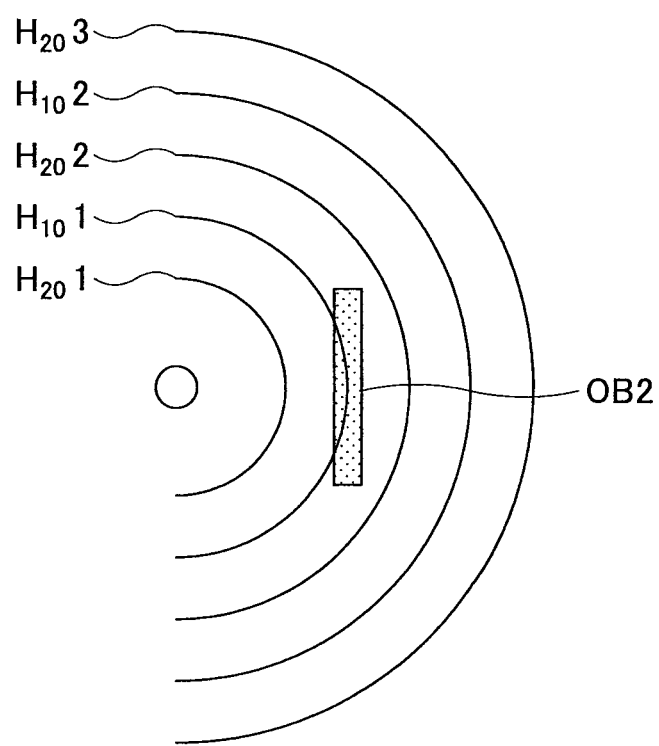
FIG. 11 is a diagram for illustrating a distribution of center portions of the high sensitivity regions of the first transmission/reception antenna 10 and center portions of the high sensitivity regions of the second transmission/reception antenna 20 centered at the first transmission/reception antenna 10.

With this arrangement, the first transmission/reception antenna 10 and the second transmission/reception antenna 20 complement each other with respect to the low sensitivity regions, and thus can prevent the reduction of the detection accuracy of the mobile object detecting apparatus 1. FIG. 11 is a diagram for illustrating a distribution of center portions $H_{10}$1, $H_{10}$2, . . . of the high sensitivity regions of the first transmission/reception antenna 10 and center portions $H_{20}$1, $H_{20}$2, $H_{20}$3 . . . of the high sensitivity regions of the second transmission/reception antenna 20 centered at the first transmission/reception antenna 10. In this way, since the high sensitivity regions of the first transmission/reception antenna 10 and the high sensitivity regions of the second transmission/reception antenna 20 appear alternately, it is possible to detect even a minute displacement of the small object OB2 as illustrated in FIG. 11 with high accuracy.

The standing wave strength detection apparatus 50 includes a diode detector which outputs a voltage according to the amplitude of the standing waves detected by the first transmission/reception antenna 10 and the second transmission/reception antenna 20, and a comparator which outputs a DC current (signal) if the voltage output from the diode detector is greater than or equal to a predetermined voltage, for example. With this arrangement, it can be determined that the object moves (or there is a mobile object) if the output of the comparator changes from Low state to High state or vice versa, for example.

The present invention does not limit to applications for which the determination result is used. For example, it can be applied to intrusion sensors for determining whether there is an intruder in a cabin of an automobile or a home, sensors for detecting actions of a driver of an automobile, sensors for detecting a heart beat, breathing, a body movement, etc., of a human, etc.

It is noted that the configuration of the standing wave strength detection apparatus 50 is not limited to the configuration described above. For example, the standing wave strength detection apparatus 50 may include an A/D converter, etc., to which the antenna voltages of the first transmission/reception antenna 10 and the second transmission/reception antenna 20 are input, and may be configured to output the variation in the amplitude. With this arrangement, it is possible to obtain information about the movement amount of the object.

According to the mobile object detecting apparatus 1 of the present invention, the first transmission/reception antenna 10 and the second transmission/reception antenna 20 complement each other with respect to the low sensitivity regions. Therefore, it is possible to prevent the reduced accuracy of detection without requiring tuning of the frequency or the antenna position.

Further, since the microwave radiated by the second transmission/reception antenna 20 can be directed to the point near the first transmission/reception antenna 10 using the reflective member 30 with a cross section of an elliptical shape, it is possible to substantially match the detection area of the first transmission/reception antenna 10 with the detection area of the second transmission/reception antenna 20.

Second Embodiment

Figure 12:
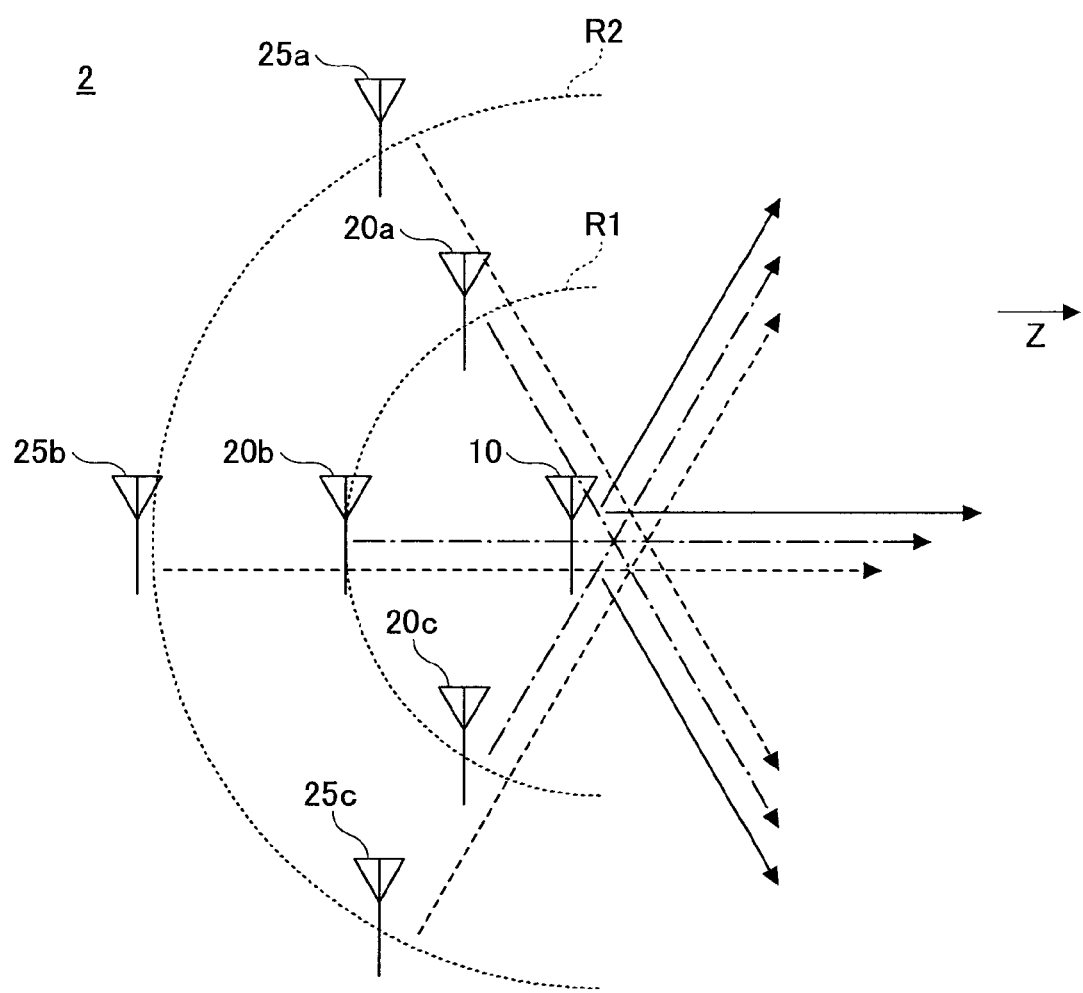
FIG. 12 is a diagram for illustrating a configuration example of a mobile object detecting apparatus 2 according to a second embodiment.

In the following, a mobile object detecting apparatus 2 according to a second embodiment of the present invention will be described with reference to the accompanying drawings. FIG. 12 is a diagram for illustrating a configuration example of a mobile object detecting apparatus 2 according to a second embodiment. The mobile object detecting apparatus 2 includes, as main components, a first transmission/reception antenna 10, a second transmission/reception antennas 20a, 20b, 20c, a third transmission/reception antennas 25a, 25b, 25c, an oscillator apparatus 40 and the standing wave strength detection apparatus 50. It is noted that components common to the first embodiment are given the same reference numerals and their explanation is omitted.

The second transmission/reception antennas 20a, 20b, 20c are located behind the first transmission/reception antenna 10 when viewed in a direction of radiation of the microwave of the first transmission/reception antenna 10. The second transmission/reception antennas 20a, 20b, 20c are arranged on a circle R1 with a radius r1 centered at the first transmission/reception antenna 10. The second transmission/reception antennas 20a, 20b, 20c radiate microwaves, which have the same frequency as the microwave radiated by the first transmission/reception antenna 10, such that they pass near the first transmission/reception antenna 10. At the transmission/reception antennas 20a, 20b, 20c antenna voltages according to the amplitudes of the corresponding standing waves are generated. The standing waves are generated when the radiated microwaves are reflected at the object. The antenna voltages are input to the standing wave strength detection apparatus 50 in which they are used to detect the movement of the object.

The third transmission/reception antennas 25a, 25b, 25c are located behind the second transmission/reception antennas 20a, 20b, 20c when viewed in a direction of radiation of the microwave of the first transmission/reception antenna 10. The third transmission/reception antennas 25a, 25b, 25c are arranged on a circle R2 with a radius r2 centered at the first transmission/reception antenna 10. The third transmission/reception antennas 25a, 25b, 25c radiate microwaves, which have the same frequency as the microwave radiated by the first transmission/reception antenna 10, such that they pass near the first transmission/reception antenna 10. At the third transmission/reception antennas 25a, 25b, 25c antenna voltages according to the amplitudes of the corresponding standing waves are generated. The standing waves are generated when the radiated microwaves are reflected at the object. The antenna voltages are input to the standing wave strength detection apparatus 50 in which they are used to detect the movement of the object.

The planes of polarization of the microwaves radiated by the second transmission/reception antennas 20a, 20b, 20c form an angle of 120° with respect to the plane of polarization of the microwave radiated by the first transmission/reception antenna 10. The planes of polarization of the microwaves radiated by the third transmission/reception antennas 25a, 25b, 25c form an angle of 240° with respect to the plane of polarization of the microwave radiated by the first transmission/reception antenna 10. With this arrangement, each of the first transmission/reception antenna 10, second transmission/reception antennas 20a, 20b, 20c and the third transmission/reception antennas 25a, 25b, 25c can easily detect as an antenna voltage the corresponding standing waves which each antenna generates for itself.

Further, the radius r1 of the circle R1 is $\lambda/16$, for example, and the radius r2 of the circle R2 is $\lambda/8$, for example. By setting such a positional relationship between the respective transmission/reception antennas, the first transmission/reception antenna 10, second transmission/reception antennas 20a, 20b, 20c and the third transmission/reception antennas 25a, 25b, 25c complement each other with respect to the low sensitivity regions, thereby preventing the reduction in accuracy of the detection of the mobile object detecting apparatus 2.

Figure 13:
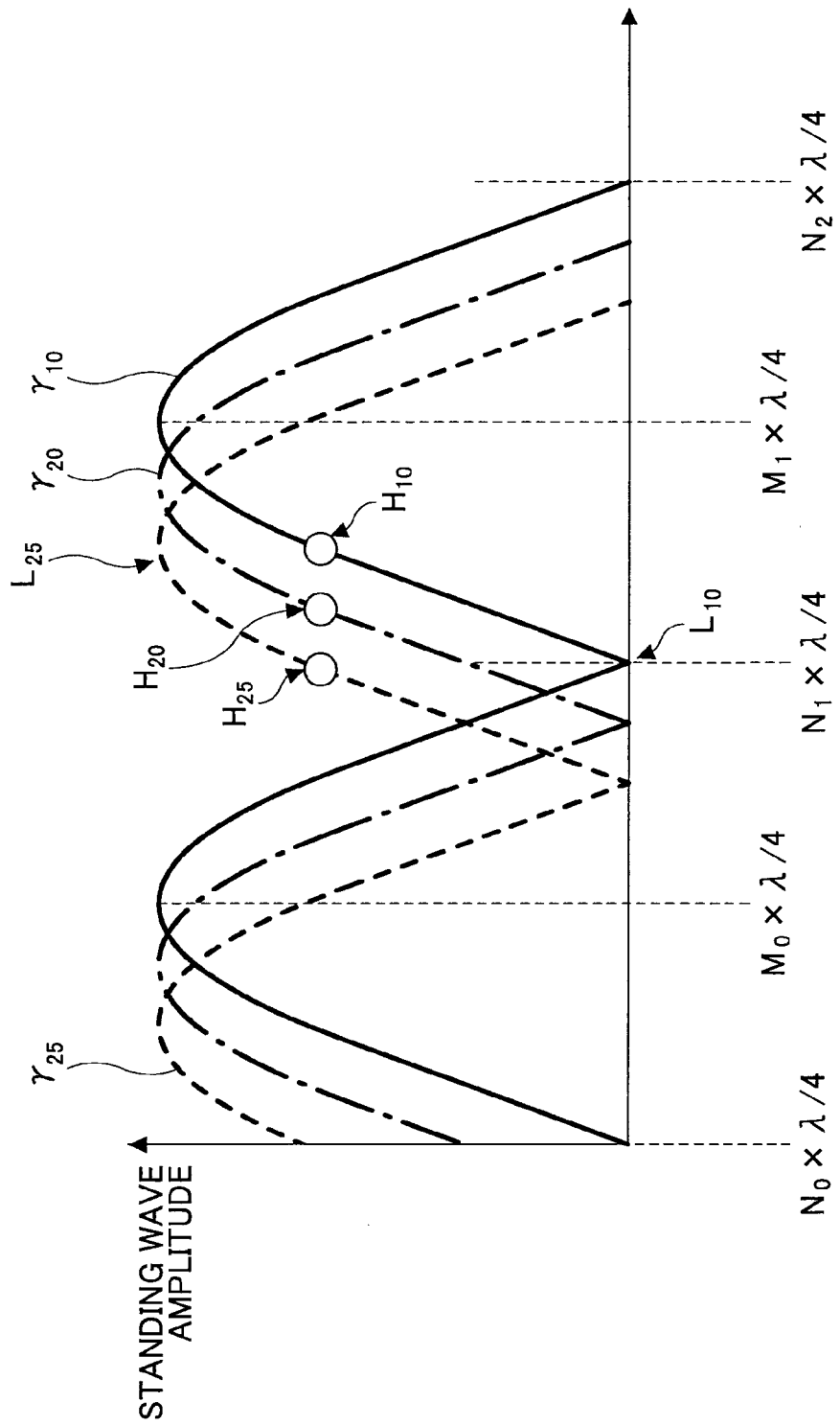
FIG. 13 is a diagram for illustrating a situation in which the high sensitivity regions and the low sensitivity regions of the standing waves generated by the first transmission/reception antenna 10, second transmission/reception antennas 20a, 20b, 20c, and third transmission/reception antennas 25a, 25b, 25c overlap one another.

FIG. 13 is a diagram for illustrating a situation in which the high sensitivity regions and the low sensitivity regions of the standing waves generated by the first transmission/reception antenna 10, second transmission/reception antennas 20a, 20b, 20c, and third transmission/reception antennas 25a, 25b, 25c. As illustrated in FIG. 13, the center portion $H_{10}$ of the high sensitivity region of the standing wave $\gamma_{10}$ generated by the first transmission/reception antenna 10, the center portion $H_{20}$ of the high sensitivity region of the standing wave $\gamma_{20}$ (in the strict sense, standing wave group) generated by the second transmission/reception antennas 20a, 20b, 20c, and the center portion $H_{25}$ of the high sensitivity region of the standing wave $\gamma_{25}$ (in the strict sense, standing wave group) generated by the third transmission/reception antennas 25a, 25b, 25c complement each other with respect to the low sensitivity regions, and this relationship continues periodically.

The first transmission/reception antenna 10, second transmission/reception antennas 20a, 20b, 20c and the third transmission/reception antennas 25a, 25b, 25c complement each other with respect to the low sensitivity regions, thereby preventing the reduction in accuracy of the detection of the mobile object detecting apparatus 2.

Further, according to the second embodiment, the high sensitivity regions are distributed at higher density with respect to the first embodiment, thereby further increasing detection accuracy.

According to the mobile object detecting apparatus 2 of the present invention, the first transmission/reception antenna 10, second transmission/reception antennas 20a, 20b, 20c and the third transmission/reception antennas 25a, 25b, 25c complement each other with respect to the low sensitivity regions. Therefore, it is possible to prevent the reduced accuracy of detection without requiring tuning of the frequency or the antenna position.

Further, according to the second embodiment, although there is a probability that manufacturing cost is increased due to the increased number of the antennas, the high sensitivity regions are distributed at higher density with respect to the first embodiment, thereby further increasing detection accuracy.

The present invention is disclosed with reference to the preferred embodiments. However, it should be understood that the present invention is not limited to the above-described embodiments, and variations and modifications may be made without departing from the scope of the present invention.

Figure 14:
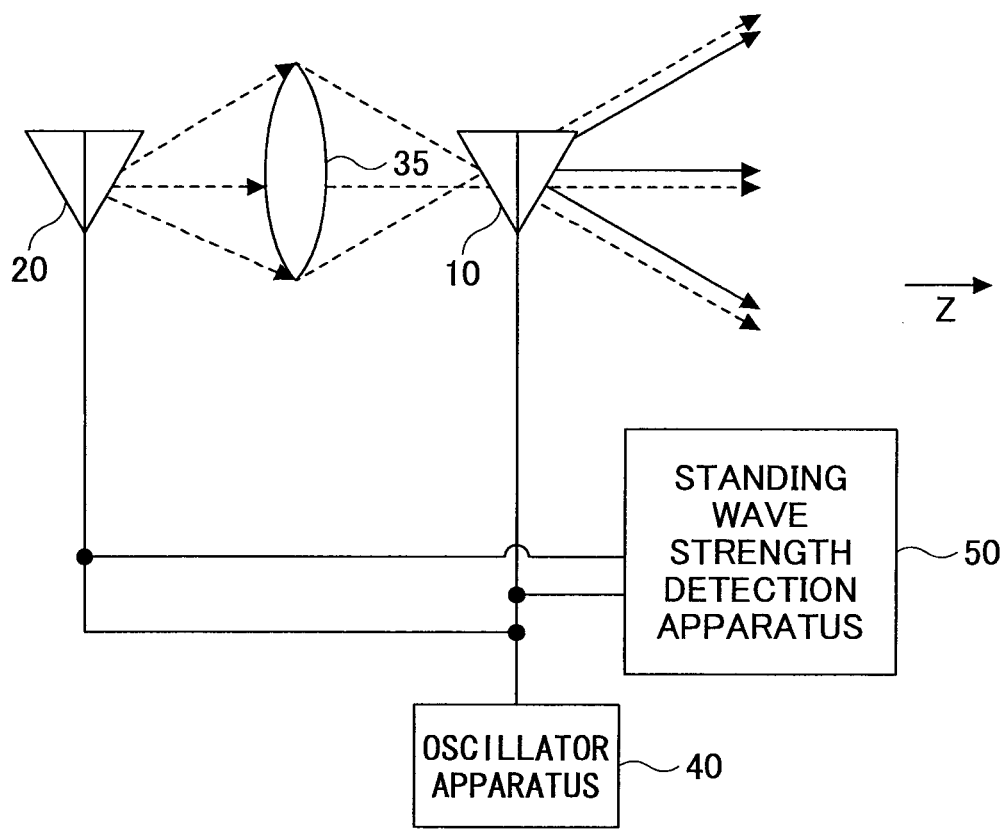
FIG. 14 is a diagram for illustrating a configuration example of a mobile object detecting apparatus according to another embodiment.

For example, as illustrated as a variant of the first embodiment in FIG. 14, the second transmission/reception antenna 20 is located behind the first transmission/reception antenna 10 when viewed in a direction of radiation of the microwave of the first transmission/reception antenna 10, and may radiate the microwave via a dielectric lens 35, which is located between the second transmission/reception antenna 20 and the first transmission/reception antenna 10, in the same direction as the first transmission/reception antenna 10. FIG. 14 is a diagram for illustrating a configuration example of a mobile object detecting apparatus according to another embodiment. The dielectric lens 35 has a function of refracting the electromagnetic wave, as is the case with an optical lens which refracts light. An index of refraction and the positional relationship between the first transmission/reception antenna 10, the second transmission/reception antenna 20 and the dielectric lens 35 are tuned such that the microwave radiated by the second transmission/reception antenna and passing through the dielectric lens 35 is directed to the point near the first transmission/reception antenna 10. With this arrangement, as is the case with the first embodiment, if the directivity of the first and second transmission/reception antenna 10 and 20 are made substantially the same, the detection area of the first transmission/reception antenna 10 can correspond to the detection area of the second transmission/reception antenna 20. Further, in this configuration, as is the case with the first embodiment, preferably, the microwave radiated by the first transmission/reception antenna 10 has a plane of polarization perpendicular to that of the microwave radiated by the second transmission/reception antenna 20. Further, preferably, the index of refraction and the positional relationship between the first transmission/reception antenna 10, the second transmission/reception antenna 20 and the dielectric lens 35 are set such that a distance over which the microwave radiated by the second transmission/reception antenna 20 travels until it reaches the point near the first transmission/reception antenna 10 becomes (K×λ/2+λ/8), where K is a positive integer.

Further, in the first and second embodiments, an actuator may be provided for varying the detection area. With this arrangement, it is possible to detect a movement of an object or the presence or absence of a mobile object in a wider area.

Further, in the mobile object detecting apparatus 2 according to the second embodiment, the second transmission/reception antennas 20a, 20b, 20c may be omitted, or the third transmission/reception antennas 25a, 25b, 25c may be omitted. Further, the second transmission/reception antennas 20a, 20b, 20c or the third transmission/reception antennas 25a, 25b, 25c may have plural antennas other than three antennas.

Figure 15:
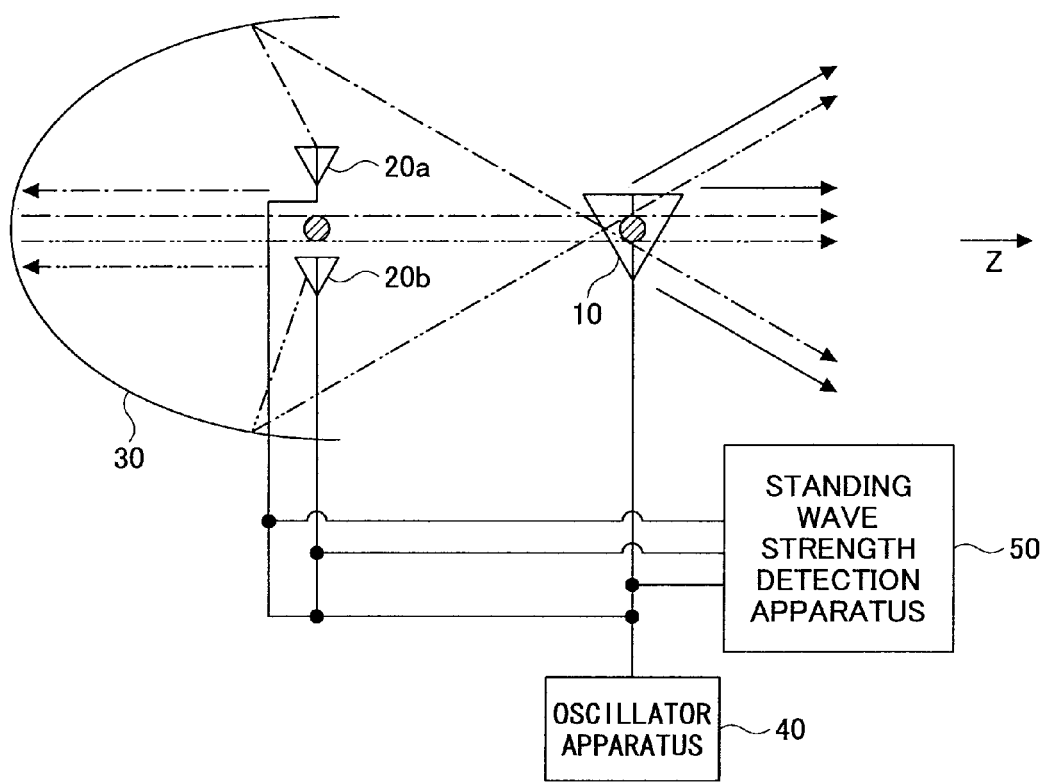
FIG. 15 is a diagram for illustrating a configuration example of a mobile object detecting apparatus according to another embodiment.

Further, as illustrated in FIG. 15, the second transmission/reception antenna 20 in the first embodiment may include the second transmission/reception antennas 20a, 20b. FIG. 15 is a diagram for illustrating a configuration example of a mobile object detecting apparatus according to another embodiment. The second transmission/reception antenna 20 is located further from the object than the first transmission/reception antenna 10, and thus is likely to be affected by higher attenuation of the microwave than the first transmission/reception antenna 10. Thus, by configuring as illustrated in FIG. 15, it is possible to increase an output of the second transmission/reception antenna 20 and increase the accuracy of the detection.

Figure 16:
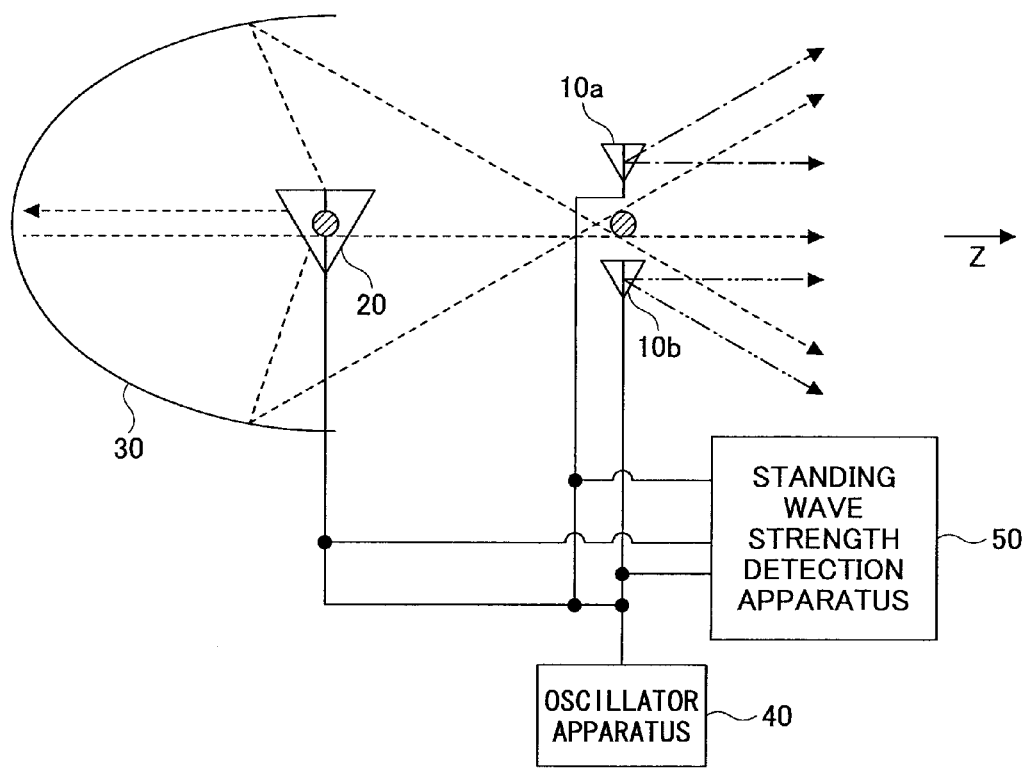
FIG. 16 is a diagram for illustrating a configuration example of a mobile object detecting apparatus according to another embodiment.
Figure 17:
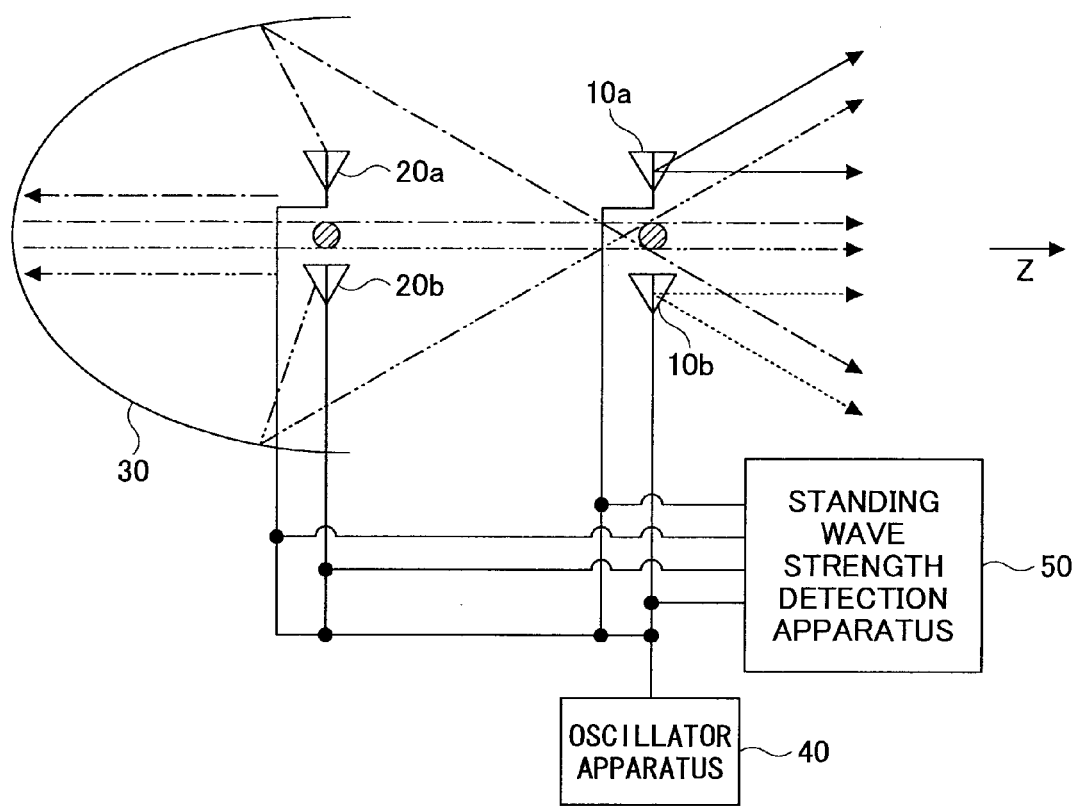
FIG. 17 is a diagram for illustrating a configuration example of a mobile object detecting apparatus according to another embodiment.

Further, as illustrated in FIG. 16 and FIG. 17, the first transmission/reception antenna 10 may include the first transmission/reception antennas 10a, 10b. FIG. 16 and FIG. 17 are diagrams for illustrating a configuration example of a mobile object detecting apparatus according to another embodiment.

It is noted that hatched circles in FIGS. 15 through 17 indicate the focal points of an ellipse which the cross section of the reflective member 30 forms.

Further, the mobile object detecting apparatus may radiate other type of an electromagnetic wave, not limited to the microwave.

Further, at least a part of the first transmission/reception antenna 10, second transmission/reception antenna 20, or at least a part of the transmission/reception antennas according to the second embodiment may include an antenna which is not of a transmission-reception integral-type, that is to say, a transmission antenna and a reception antenna, separately. If the first transmission/reception antenna 10 includes a first transmission antenna 10A and a first reception antenna 10B, the second transmission/reception antenna 20 or the second transmission/reception antennas 20a, 20b, 20c according to the second embodiment may radiate the microwaves such that they pass near the first transmission antenna 10A (corresponding to a point from which the electromagnetic wave is radiated in claims).

INDUSTRIAL APPLICABILITY

The present invention can be utilized in manufacturing industries for an apparatus which detects a movement of an object or the presence or absence of a mobile object, and automobile industries, security services, etc.

The invention claimed is:

1. A mobile object detecting apparatus, comprising:
first radiation detecting means for radiating an electromagnetic wave and detecting a standing wave which is generated due to reflection of the radiated electromagnetic wave at an object;
second radiation detecting means for radiating an electromagnetic wave having the same frequency as the electromagnetic wave radiated by the first radiation detecting means such that the radiated electromagnetic wave passes near a point in the first radiation detecting means from which the electromagnetic wave is radiated, and detecting a standing wave which is generated due to reflection of the radiated electromagnetic wave at an object;
wherein the mobile object detecting apparatus is configured to detect a movement of an object or the presence or absence of a mobile object based on the standing wave detected by the first radiation detecting means and/or the standing wave detected by the second radiation detecting means,
the second radiation detecting means radiates the electromagnetic wave in a direction opposite to a direction in which the first radiation detecting means radiates the electromagnetic wave, and reflects the radiated electromagnetic wave at a reflective member with an elliptical cross section to be directed to the point in the first radiation detecting means from which the electromagnetic wave is radiated,
the elliptical shape of the reflective member has two focal points at points in the first and second radiation detecting means from which the electromagnetic waves are radiated, and
a distance, over which the electromagnetic wave radiated by the first radiation detecting means travels until it reaches near the point in the first radiation detecting means from which the electromagnetic wave is radiated, corresponds to a distance of an integral multiple of a wave length of a half cycle of the electromagnetic waves radiated by the first and second radiation detecting means plus a wave length of a predetermined period which is smaller than the half cycle.

2. The mobile object detecting apparatus as claimed in claim 1,
wherein the electromagnetic waves radiated by the first and second radiation detecting means have planes of polarization which differ by a predetermined angle.

3. The mobile object detecting apparatus as claimed in claim 2,
wherein the wave length of a predetermined period corresponds to a wave length of a one-eighth cycle of the electromagnetic waves radiated by the first and second radiation detecting means.

4. The mobile object detecting apparatus as claimed in claim 1,
wherein the wave length of a predetermined period corresponds to a wave length of a one-eighth cycle of the electromagnetic waves radiated by the first and second radiation detecting means.

5. A mobile object detecting apparatus, comprising:
first radiation detecting means for radiating an electromagnetic wave and detecting a standing wave which is generated due to reflection of the radiated electromagnetic wave at an object;
second radiation detecting means for radiating an electromagnetic wave having the same frequency as the electromagnetic wave radiated by the first radiation detecting means such that the radiated electromagnetic wave passes near a point in the first radiation detecting means from which the electromagnetic wave is radiated, and detecting a standing wave which is generated due to reflection of the radiated electromagnetic wave at an object;
wherein the mobile object detecting apparatus is configured to detect a movement of an object or the presence or absence of a mobile object based on the standing wave detected by the first radiation detecting means and/or the standing wave detected by the second radiation detecting means,
the second radiation detecting means is located behind the first radiation detecting means when viewed in a direction of radiation of the electromagnetic wave of the first radiation detecting means, and radiates the electromagnetic wave in substantially the same direction as the first radiation detecting means via a dielectric lens for refracting the electromagnetic wave, the dielectric lens being disposed between the second radiation detecting means and the first radiation detecting means, and
a distance, over which the electromagnetic wave radiated by the first radiation detecting means travels until it reaches near the point in the first radiation detecting means from which the electromagnetic wave is radiated, corresponds to a distance of an integral multiple of a wave length of a half cycle of the electromagnetic waves radiated by the first and second radiation detecting means plus a wave length of a predetermined period which is smaller than the half cycle.

6. The mobile object detecting apparatus as claimed in claim 5,
wherein the electromagnetic waves radiated by the first and second radiation detecting means have planes of polarization which differ by a predetermined angle.

7. The mobile object detecting apparatus as claimed in claim 6,
wherein the wave length of a predetermined period corresponds to a wave length of a one-eighth cycle of the electromagnetic waves radiated by the first and second radiation detecting means.

8. The mobile object detecting apparatus as claimed in claim 5,
wherein the wave length of a predetermined period corresponds to a wave length of a one-eighth cycle of the electromagnetic waves radiated by the first and second radiation detecting means.

9. A mobile object detecting apparatus, comprising:
first radiation detecting means for radiating an electromagnetic wave and detecting a standing wave which is generated due to reflection of the radiated electromagnetic wave at an object;
plural second radiation detecting means for radiating electromagnetic waves having the same frequency as the electromagnetic wave radiated by the first radiation detecting means such that the radiated electromagnetic waves pass near the first radiation means, and detecting standing waves which are generated due to reflection of the radiated electromagnetic waves at an object, the second radiation detecting means being located behind the first radiation detecting means when viewed in a direction of radiation of the electromagnetic wave of the first radiation detecting means;
wherein the mobile object detecting apparatus is configured to detect a movement of an object or the presence or absence of a mobile object based on the standing wave detected by the first radiation detecting means and/or the standing wave detected by the second radiation detecting means,
plural second radiation detecting means are arranged on a circle or a sphere centered at the first radiation detecting means, and
distances, over which the electromagnetic waves radiated by the first radiation detecting means travel until they reach near the first radiation detecting means, correspond to a distance of an integral multiple of a wave length of a half cycle of the electromagnetic waves radiated by the first and second radiation detecting means plus a wave length of a predetermined period which is smaller than the half cycle.

10. The mobile object detecting apparatus as claimed in claim 9,
wherein the electromagnetic waves radiated by the first and second radiation detecting means have planes of polarization which differ by a predetermined angle.

11. The mobile object detecting apparatus as claimed in claim 10,
wherein the wave length of a predetermined period corresponds to a wave length of a one-eighth cycle of the electromagnetic waves radiated by the first and second radiation detecting means.

12. The mobile object detecting apparatus as claimed in claim 9,
wherein the wave length of a predetermined period corresponds to a wave length of a one-eighth cycle of the electromagnetic waves radiated by the first and second radiation detecting means.

* * * * *